Oct. 13, 1953     L. H. SMITH     2,655,411
METHOD AND APPARATUS FOR HANDLING FLUIDIZABLE
FINELY DIVIDED SOLID MATERIALS
Filed Jan. 2, 1952     3 Sheets-Sheet 1
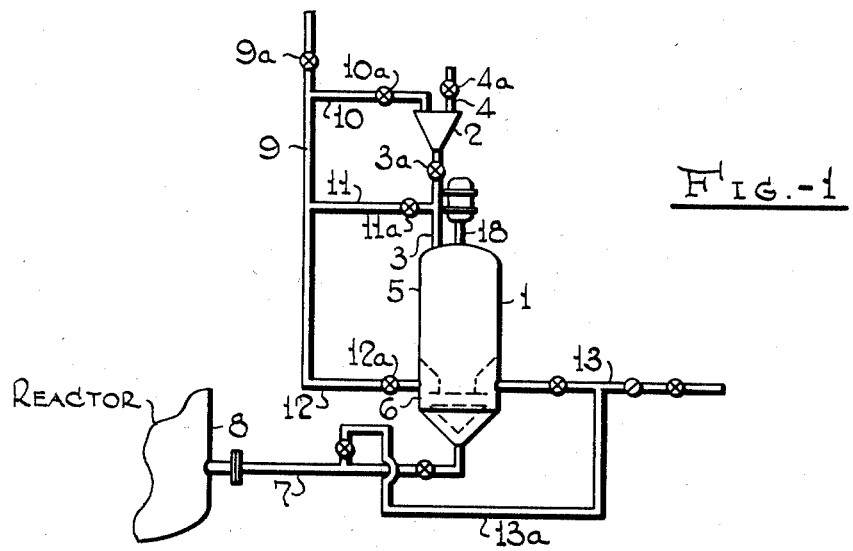
FIG.-1
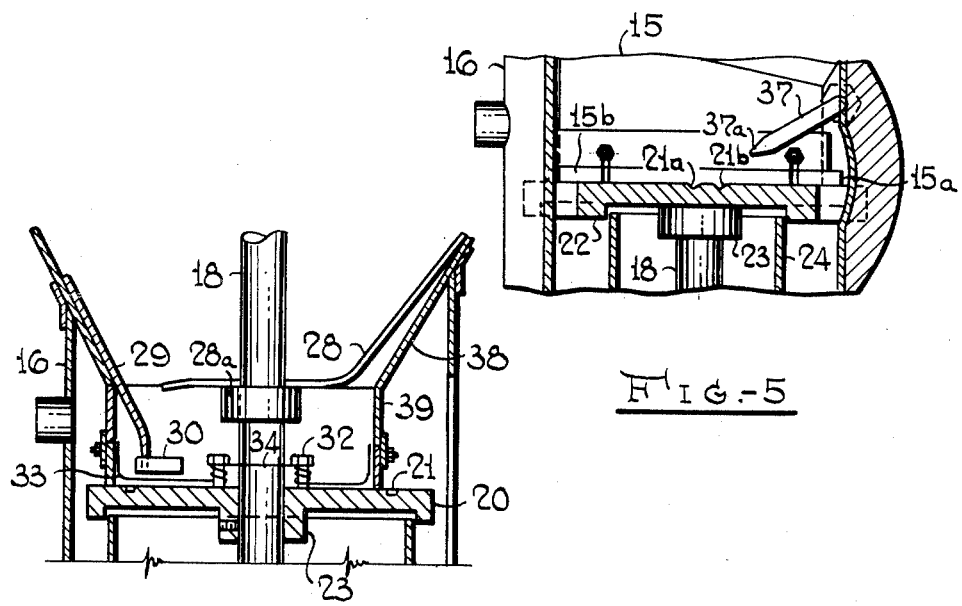
FIG.-5
FIG.-6
Lester H. Smith     Inventor
By W. V. J. Heilman Attorney

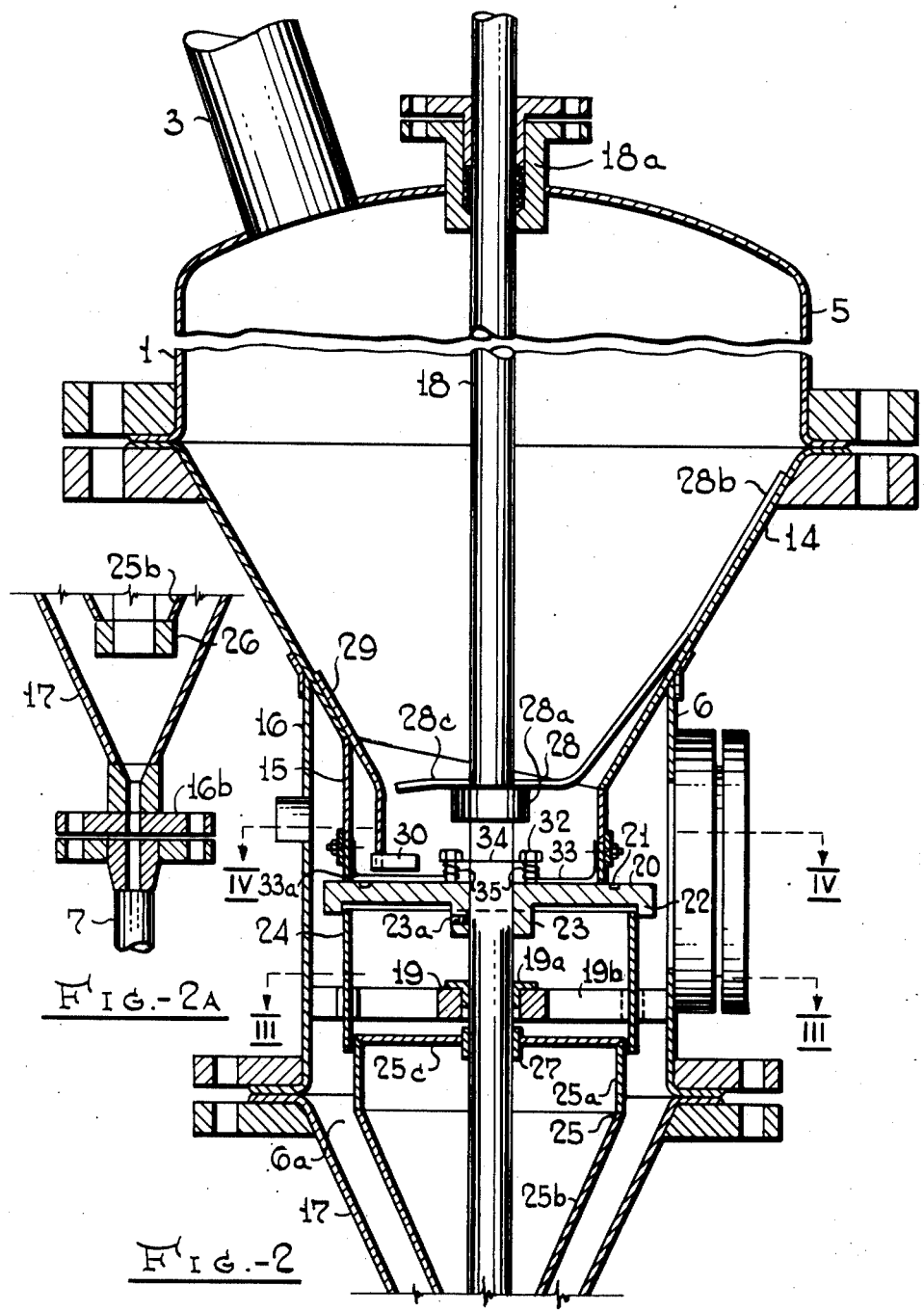

Oct. 13, 1953 L. H. SMITH 2,655,411
METHOD AND APPARATUS FOR HANDLING FLUIDIZABLE
FINELY DIVIDED SOLID MATERIALS
Filed Jan. 2, 1952 3 Sheets-Sheet 3

Lester H. Smith  Inventor
By W. O. Heilman  Attorney

Patented Oct. 13, 1953

2,655,411

UNITED STATES PATENT OFFICE 2,655,411

METHOD AND APPARATUS FOR HANDLING FLUIDIZABLE FINELY DIVIDED SOLID MATERIALS

Lester H. Smith, Maplewood, N. J., assignor to Standard Oil Development Company, a corporation of Delaware Application January 2, 1952, Serial No. 264,516

3 Claims. (Cl. 302—49)

1

The present invention relates to a system for handling finely divided solid materials, and particularly to such a system in which the finely divided solids are catalyst materials to be supplied to a reactor in certain predetermined amounts as a dispersion of such material in a carrier gas. The invention further is especially concerned with the provision of an apparatus including a feeder mechanism for the handling of finely divided solid materials and, although specifically related to a system for handling catalyst materials, is also suitable for employment under any condition where finely divided solid materials are to be supplied in controlled and measured amounts to a related point of use or treatment. Additional utility for the apparatus contemplated might also be found as in a system for burning or treating finely divided powdered coal, clays, or other comparable materials.

The invention may be more fully understood from the following description when read in conjunction with the accompanying drawings in which Figure 1 is a diagrammatic illustration of a system for feeding finely divided aluminum chloride catalyst to a reactor for polymerizing isobutylene to produce polyisobutylene;

Figures 2 and 2A show a vertical section through a feeder mechanism according to the invention, and such as is indicated in the system shown by Fig. 1, in which Fig. 2A is a matched line continuation of the structure of Fig. 2;

Figure 5 is a vertical section taken along the line V—V of Fig. 4, through plate 20 thereof; and Figure 6 is a vertical section through a portion of an apparatus such as shown in Figure 2 illustrating an alternate form of construction according to the invention.

Figure 3:
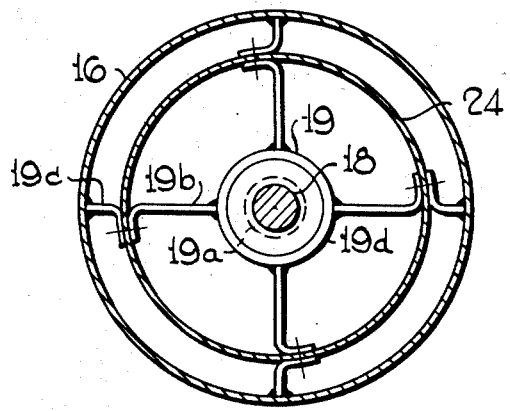
Fig. 3 is a horizontal section through the apparatus according to Figure 2 taken along the line III—III thereof.

Referring to the drawings in greater detail, in the system as diagrammatically illustrated by Figure 1, the numeral 1 designates a feeder apparatus according to the present invention. Numeral 2 designates a supplementary loading hopper for supplying finely divided materials to the feeder mechanism 1. The loading hopper 2 is connected to the feeder mechanism 1 as by means of a conduit 3 containing a valve 3a. A supply conduit line 4 is connected to the loading hopper 2 and provided with a valve 4a. The feeder 1 includes an upper, hopper or body portion 5 and a lower, casing or base portion 6. The feeding mechanism of the apparatus is substantially contained in the lower portion 6.

The portion 6 is connected in turn to a conduit 7 communicating with apparatus for treatment or employment of finely divided, powdered materials such as a reactor vessel 8. The loading hopper 2 and the feeder 1 are connected to a vent conduit line 9 as by means of conduits 10, 11 and 12. Suitable pressure control valves 10a, 11a, 12a or other similar means may be provided in the respective lines, including valve 9a in the vent line 9, for the purpose of maintaining balanced or differential pressures in the loading hopper 2 and feeder 1, as well as between the upper and lower portions of the feeder 1. The conduit 13 provides for the introduction of a gas material into the lower portion of the feeder 1, for purposes later described, and also to provide a carrier gas for transporting solid materials admitted to the lower portion of feeder 1 and therefrom through the line 7 to the point of use or treatment as represented by the vessel 8. A valved by-pass conduit 13a communicates between the conduit 13 and conduit 7 to permit flow through the conduit 13 to be partially or entirely diverted from the feeder 1. Valves in the conduits 13, 13a and 7 are provided for suitable control of the desired flow.

Figure 4:
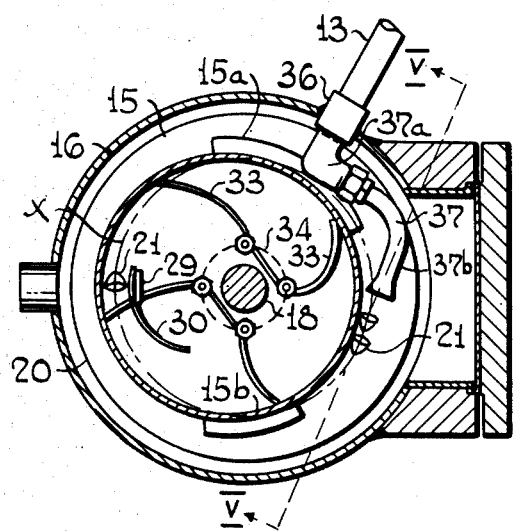
Figure 4 is a horizontal section through the apparatus according to Figure 2 taken along the line IV—IV thereof.

As shown in Fig. 2, the feeder 1 is composed of an upper body portion 5 of generally cylindrical shape, having an inverted frusto-conical bottom 14, which together form a hopper-type storage vessel for finely divided solid materials. The conical bottom of the vessel terminates in an outlet at its apex end and is provided with a cylindrical discharge conduit or nozzle ring member 15. As shown in Fig. 2, the lower edge of the cone outlet and the upper edge of the ring 15 are oblique edge portions which meet and match in a plane angularly related to a horizontal plane through the structure. The lower edge portion of the member 15 lies in a plane transversely of the structure, and preferably is finished, as by machining, to provide a substantially smooth, regular surface on said edge. The conical bottom portion 14 and the ring 15 as shown in Fig. 2 are in effect matched ungulate sections of a cone and of a cylinder respectively. If desired, the nozzle ring member may be formed in two parts, an upper part, which is attached to the conical bottom 15, and a lower part removably attached to said upper part, and provided for replacement when worn or damaged. Any suitable means may be provided for association and attachment of the upper and lower parts, including spring mounting means, providing some compensation for wear between the lower edge portion of member 15 and the surface of a related part to be described later. As illustrated by Fig. 4, the ring member 15 is provided with external surface extension portions 15a and 15b terminating at the lower ring edge, and being formed and disposed as later described. In effect, such extensions provide arcuate thickened edge portions on the ring member 15.

The lower portion 6 of the feeder 1 is formed by means of a casing including an annular section 16 joined at its upper end to the side wall of the hopper bottom 14 at a point above the attachment of ring member 15, having a diameter greater than that of the ring member, and a lower casing section 17 of substantially inverted conical form, joined to the lower edge of upper section 16, and terminating in a flange type connection 16b with a conduit 7 at the lower end thereof. Any suitable means may be provided for assembling the several portions and sections of the casing elements of the feeder 1 such as by welding, or by flange connections as shown.

A rotatable shaft member 18 extends downwardly, into the vessel 1 through the top of the upper casing portion thereof, being provided for fluid-tight relation thereto as by means of a packing gland seal 18a. Suitable means, not shown, are provided for driving the shaft 18 at variable rates of speed as required. The shaft 18 extends downwardly through the feeder vessel 1, in generally coaxial relation thereto, into spaced relation to the lower apex end of the conical section 17. By reason of the nature and disposition of the ring member 15, however, this element will be eccentric to the axis of the shaft and of the vessel. The shaft is supported at its lower end by means of a spider 19 and a bearing 19a substantially integral therewith. The spider 19 may be of any suitable form, such as that illustrated in Figure 3, and is secured to the inner surface of the casing section 16 at an intermediate level therein and transversely thereof.

Mounted coaxially on the shaft 18, within the casing section 16, is a feeder plate member 20. As shown, this plate member has a substantially flat upper surface of a diameter slightly greater than that of the ring member 15. Preferably the surface is smoothly finished as by machining, and the member positioned on said shaft so as to engage the lower edge portion of the ring member 15, and its extension portions 15a and 15b, to provide for substantially uniform, sliding surface contact therewith. If desired, the plate 20 may be resiliently mounted on shaft 18, to provide compensation for wear between it and the ring 15, or other conventional means may be provided for wear compensation between plate 20 and ring 15.

In the upper surface of the plate member 20 are disposed a plurality of pockets 21 circularly arranged in spaced relation to the peripheral edge of the plate and in arcuately spaced relation one to the other. The nature and arrangement of the pockets 21 are further illustrated in Fig. 4 of the drawings. As shown therein, the pockets are disposed in equally spaced relation radially from the axis of the plate, and the shaft 18, the radial dimension being slightly less than the radius of the ring member 15. Also, as shown in Fig. 2, the plate member 20 is provided with an annular dependent edge or lip portion 22 peripherally of the plate, and with an annular central boss 23 providing a passage to receive the shaft 18. The plate is secured to the shaft 18 as by means of set screws 23a extended through the boss 23.

Immediately below the plate 22 is an annular shield member 24. This shield member is preferably supported on the spider 19 as shown, but may be mounted in any other suitable fashion. The shield 24 is of a diameter slightly less than that of the plate, and is mounted coaxially with the shaft 18 with the upper end extending into closely spaced relation to the lower surface of the plate, and in telescopic relation to the dependent edge portion 22 thereof. The lower end portion of the shield 24 extends downwardly below the spider 19.

Also mounted coaxially on the shaft 18 is a filler and agitator element 25 which, as shown, is formed by means of an upper annular casing element 25a, and a lower inverted frusto-conical casing element 25b, joined to the lower edge portion of the element 25a by its base edge portion, and at its apex end, to a collar 26 adapted to receive and be secured to the end of shaft 18. The upper end of the element 25a extends upwardly into telescopic relation inwardly of the lower end of the shield 24 and is provided with an annular cover 25c rigidly secured to the element 25a at its peripheral edge, and including a concentric collar member 27 adapted to receive and to be rigidly secured to the shaft 18. The shield 24 and element 25, together with the walls of the base portion 6 form an annular passageway 6a of decreasing cross-sectional area.

Within the bottom 14 of the upper body portion 5 of feeder 1, there is secured to the shaft 18 an agitator element 28 as by means of collar 28a. This element is preferably formed of spring steel or another resilient material and has a long arm portion 28b and a short arm portion 28c. The long arm portion 28b is preferably formed substantially to fit the conformation of the inner surface of the bottom 14, and adapted to resiliently engage such surface and be maintained in close surface contact therewith. Also provided interiorly of the bottom 14 is a fixed agitator arm 29 secured to the surface of the bottom 14, and extending outwardly and downwardly therefrom into closely spaced relation to the lower edge of the ring member 15. The lower end of this arm is provided with an arcuately curved flat strip 30 disposed with reference to the curved inner surface of the ring 15 so as to form a powder chute decreasing in width in the direction of rotation of the plate 20 and with its narrowest dimension substantially equal to or not substantially greater than the greatest width of a pocket 21, the lower edge of this element 30 also being in substantially uniform closely spaced relation to the surface of said plate.

Additional agitator means are provided by a plurality of spring elements secured to the upper surface of the plate 20 as by means of bolt members 32. As shown in Figure 2, and more particularly in Figure 4, these elements are formed in pairs, each having a horizontal arm 33 extending toward the ring member 15 and provided with an end portion 33a extending vertically upward therefrom. The arms 33, as shown, are connected and made integral in pairs by means of an intermediate portion 34 helically coiled to form two spaced annular vertical spring mounting portions 34a, adapted to receive the bolt members 32. The arms 33 are of such dimension as to engage the inner surface of ring member 15 at their outer ends. If desired, the spring arm elements 33 may be individual elements each held by means of a bolt 32.

In Figure 3, the spider 19 and its structural relationships to the shield member 24, the shaft member 18 and the casing section 16 is more specifically illustrated. As shown, the spider is formed by a plurality of the spider arm elements 19b and 19c, the inner ends of the elements 19b being secured as by welding to a collar 19d adapted to receive and contain the shaft bearing 19a. The outer ends of the elements 19c are secured as by welding to the inner surface of the casing section 16, the elements 19b and 19c being disposed substantially in uniform alignment radially. The outer end of each element 19b and of each corresponding element 19c are secured to the inner and outer surfaces respectively of the shield member 24. As previously indicated, the structure as shown may be accomplished in any other suitable fashion.

The arrangement of the plate element 20 and its relationship to other associated elements of the apparatus, as illustrated in Figure 2, is further illustrated by Figure 4. In particular, Fig. 4 shows the positioning of surface extension portions 15a and 15b on ring member 15 for the purpose of establishing an effective seal with the plate 20. Also, as illustrated, the effective result of the eccentric relationship between the ring 15 and the plate 20 is more clearly illustrated by Fig. 4. As shown, the pockets 21 being disposed along a common circular center line which is concentric with the plate also move eccentrically with relation to the ring 15. The radius of the circular center line is such that in its eccentric relationship to the ring 15, the outer edge portions of the pockets will lie wholly within the ring 15 for a short distance of their total arcuate travel, and the inner edge portions wholly without the ring at a point diametrically opposite. During intermediate stages, each pocket will be covered and uncovered gradually by the lower edge of the ring. To avoid a possible condition in which a portion of a pocket may be exposed interiorly and exteriorly of the ring at the same time, the extension portions 15a and 15b are secured to the exterior surface of the ring 15 so as to combine with the ring itself to provide a cover for each pocket as it emerges from the interior of the ring 15 to be fully exposed externally thereof, and as it returns to be fully exposed internally thereof. Preferably, the extension portions 15a and 15b extend for at least a short distance either side of the point at which the center line of the several pockets intersects the line of the outer surface of ring 15. The center line of the pockets is indicated in Fig. 4 by the letter $x$. Also illustrated in Fig. 4 is a means for discharging gaseous materials into the casing 16 as supplied by way of the conduit 13. A shown, this means comprises a coupling element 36 opening through the wall of the casing 16, threaded so as to receive the conduit 13 externally of the casing, and internally a tubular jet nozzle member 37 secured to the coupling by means of the fitting 37a. The nozzle member 37 may be of any suitable form. As shown, it is a tubular member having a flattened discharge end 37b disposed with the center line substantially tangential to the center line of the pockets 21. The flattened end 37b may provide for the discharge of a fan-like jet, or by completely closing the end of the tubular member and drilling small openings therein, the gaseous material may be discharged as a plurality of fine streams.

The arrangement of the nozzle 37 with relation to the pockets 21 and plate 20 is further indicated by Fig. 5. In this figure, the pockets are shown as having a substantially triangular cross-section formed or cut into the surface of the plate 20 substantially at an angle of 30° and pointing in the direction of rotation of the plate 15. For example, the pockets may be formed by a cylindrical milling cutter applied to the plate at the angle of 30 degrees to a depth not substantially greater than one-half the diameter of the cutter element. The bottom wall 21a of each pocket forms an angle with the plate surface of 30°, while the end wall 21b forms an angle of 60° with the plate surface. Although thus shown, this angular relationship may be varied as required by any specific condition of operation. It is considered desirable, however, that the nozzle element 37 and its tip 37a be so disposed that it will discharge a jet of gaseous material against the surface of the plate and into the pocket 21 at an angle of substantially the same degree relative to the plate surface, as is the angle of the pocket end wall portion 21b.

In the modification of the invention as illustrated by Fig. 6, that portion of the apparatus corresponding to the bottom 14 of the feeder upper body portion, 5, as shown in Fig. 2, is an inverted, skewed, frusto-conical member 38, and the member corresponding to the ring 15 of the apparatus as illustrated by Fig. 2, is a right cylindrical member 39. In all other respects, the associated elements of the structure will be as described with reference to Fig. 2.

In operation, a finely divided, powdered material is loaded into the upper hopper 2 by way of conduit 4 through valve 4a. The valve 4a is closed and valve 3a opened to discharge this material through conduit 3 into the upper portion 5 of feeder 1. By rotation of the shaft 18 and thereby the plate 20, powdered material is withdrawn in pocket 21 from the interior of the ring member 15 into the chambered portion exteriorly of the ring, within the casing 16. A gaseous material is supplied through the conduit 13, and the nozzle member 37, to be discharged against the surface of the plate 20 exposed beyond the ring member 15 and into the pockets 21 therein, thus flushing and emptying each pocket as it receives the full effect of the stream of gaseous material jetted from the nozzle 37. The pressure of this gas is preferably maintained at a level higher than that of the conduit 7 and the pressure of the apparatus to which conduit 7 may be connected, as in the reactor vessel 8, thereby creating fluid flow from the interior of the lower portion 6 of the feeder 1 into and through conduit 7. The velocity of this flow is maintained or slightly increased by reducing the cross-sectional area of the space within the lower casing portion 17 as by means of the filler and agitator element 25, and also by reason of the fact that the section 17 and the filler 25 being conical in form, the annular space between them decreases in total cross-sectional area downwardly toward the inlet to conduit 7. The velocity of flow through the annular space between the casing sections 16 and 17 and the members 24 and 25 respectively is to be maintained at a level sufficient to carry the powdered materials evacuated from the plate as a dispersion or suspension in the injected gaseous material.

A typical finely divided solid material would be a sublimed aluminum chloride catalyst material such as might be employed in a system for polymerization of isobutylene to polyisobutylene, substantially as indicated in Fig. 1. In such an operation the powdered aluminum chloride preferably would have a particle size ranging from about 0.833 millimeter to about 0.147 millimeter in their greatest diameter, with a relative proportion of particle sizes substantially as shown by the following table:

| Percent of powdered material | Size of particles in millimeters |
|---|---|
| 2.5 | 0.833 and larger. |
| 26.5 | 0.833 to 0.417. |
| 23.5 | 0.417 to 0.246. |
| 26.5 | 0.246 to 0.147. |
| 21.0 | 0.147 and smaller. |
| 100.0 | |

Also typical of the system, the gaseous material supplied by way of the conduit 13 may be any suitable gaseous material which is dry and non-reactive in the polymerization reaction contemplated. Carbon dioxide and ethane are suitable gaseous materials; under other circumstances other gaseous materials may be employed, including air and reactive hydrocarbon gases. Bridging in the annular space between the members 24 and 25 and the inner wall of the casing sections 16 and 17 respectively is substantially avoided by means of the rotation of the filler-agitator 25 secured to the shaft 18. Bridging may also be avoided by maintaining a sufficient flow velocity through the passageway 6a and conduit 7 to prevent settling of the larger particles.

The rate at which the solid materials are fed through the conduit 7 will be determined and may be controlled either by varying the speed of rotation of the plate 20, or by providing interchangeable plate members in which pockets of different volume or spacing may be provided. When a plate of any specific capacity is employed, the feed rate may be varied by varying the speed of rotation of the shaft 18 and thereby the plate 20.

What is claimed is:

1. Apparatus for handling finely divided solid materials, comprising a container vessel, an inverted frusto-conical bottom portion on said vessel having a bottom outlet opening downwardly therefrom, a casing member including an upper cylindrical portion and a lower inverted frusto-conical outlet portion, the upper end of said cylindrical portion secured to the exterior surface of said vessel bottom portion and dependent therefrom, enclosing said bottom outlet in radially spaced relation thereto, said casing member being disposed in coaxial relation to said vessel, a cylindrical outlet nozzle element, having upper and lower edge portions, secured to the vessel bottom outlet by the upper edge portion and dependent therefrom in eccentric relation to the axis of said vessel and casing, in radially spaced relation to said casing, a rotatable drive shaft extended downwardly through said vessel into said casing and concentrically thereof, terminating in spaced relation to the casing outlet, a circular plate member mounted coaxially with said shaft with the upper surface of said plate in sliding surface contact with the lower edge portion of said nozzle outlet, said outlet and plate being eccentrically related, one to another, a dependent peripheral lip on said plate, a plurality of recessed pocket portions in the upper surface of said plate, disposed therein as an arcuately spaced ring of pockets, said ring spaced radially from the periphery of said plate, whereby upon rotation of said shaft and plate said pockets are successively moved into and out of the interior space defined by said nozzle element and plate, means interiorly of said vessel bottom portion and nozzle for directing solid materials into said pockets, conduit means exteriorly of said nozzle for directing a stream of gaseous material angularly against said plate beyond the nozzle and into said pockets, a fixed cylindrical shield member below said plate inwardly of the lip thereon and in telescopic coaxial relation thereto, a hollow filler-agitator element carried by said shaft extending upwardly into said shield in telescopic relation thereto, and downwardly into the outlet portion of said casing member, said filler-agitator element substantially corresponding in shape to said casing element and spaced radially with reference to the inner walls thereof to form an annular passageway of downwardly decreasing cross-sectional area, separate conduit means for respectively introducing finely divided solid materials into said vessel, for supplying a gaseous material to said nozzle means, and for removing gaseous materials and solid materials from the outlet portion of said casing member.

2. An apparatus for handling finely divided solid materials, comprising the combination of a vertical casing; a horizontal feeder plate coaxially disposed within said casing for rotation therein and in radially spaced relation thereto; a vertical tubular conduit element disposed within said casing above said plate in eccentric relation to said casing and plate, said conduit element having a lower end engaging said plate in slidable surface contact and defining thereon an enclosed area eccentrically of the plate surface; a concentric circular series of recessed pockets in said plate surface, said series having a radius such that upon rotation of the plate each pocket is moved into said enclosed area to lie wholly within said conduit element during at least a portion of such rotation, and out of said area to lie wholly without said conduit element during a diametrically opposite portion of such rotation; arcuate radial extension portions on said conduit element disposed in spaced relation circumferentially of the lower end of said conduit element in slidable contact with said plate surface, said portions adapted to cover said pockets as moved into and out of the enclosed area; and conduit means for introducing a gaseous, fluidizing, carrier medium for said solid materials into said casing, said conduit means directed so as to discharge a stream of said medium into said pockets exteriorly of said conduit element.

3. An apparatus for handling finely divided solid materials, comprising in combination a hopper container for said materials, said container having a bottom outlet; a horizontal feeder plate disposed in coaxial relation to said hopper and in vertically spaced relation to the bottom outlet thereof; an ungulate section of a tubular conduit element secured by its slant edge to said hopper at the outlet, extending vertically downward therefrom into slidable contact at its lower end with the upper surface of said feeder plate and in eccentric relation thereto, said conduit element defining an eccentric, enclosed surface area on said plate; a concentric circular series of recessed pockets in said plate surface, said series having a radius such that upon rotation of the plate each pocket is moved into said enclosed area to lie wholly within said conduit element during at least a portion of such rotation, and out of said area to lie wholly without said conduit element during a diametrically opposite portion of such rotation; arcuate radial extension portions on said conduit element disposed in spaced relation circumferentially of the lower end of said conduit element in slidable contact with said plate surface, said portions adapted to cover said pockets as moved into and out of the enclosed area; and conduit means for introducing a gaseous, fluidizing, carrier medium for said solid materials into said casing, said conduit means directed so as to discharge a stream of said medium into said pockets exteriorly of said conduit element.

LESTER H. SMITH.

References Cited in the file of this patent

UNITED STATES PATENTS

| Number | Name | Date |
|---|---|---|
| 1,041,548 | Wilson | Oct. 15, 1912 |
| 1,890,925 | Allington | Dec. 13, 1932 |
| 1,993,249 | Scholz | Mar. 5, 1935 |
| 2,299,565 | Colburn | Oct. 20, 1942 |

FOREIGN PATENTS

| Number | Country | Date |
|---|---|---|
| 58,920 | Denmark | July 21, 1941 |